May 22, 1934.   H. R. BLISS ET AL   1,959,609
STITCHING MACHINE
Filed April 21, 1932    7 Sheets-Sheet 2
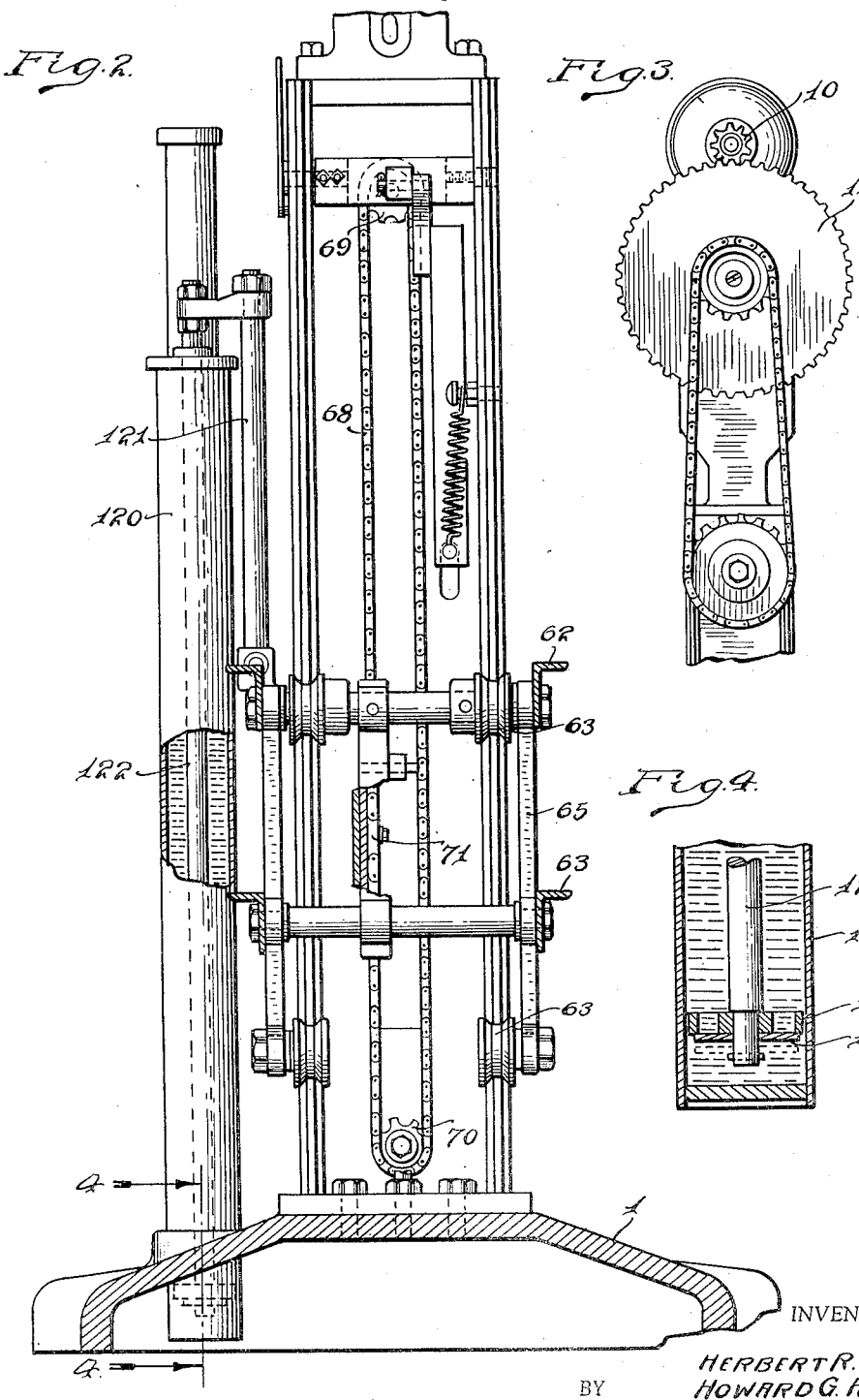
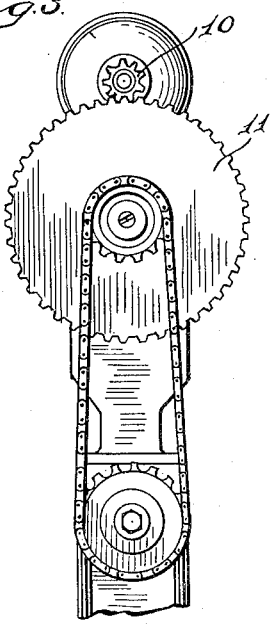
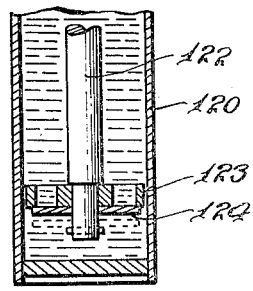
INVENTORS.
HERBERT R. BLISS.
HOWARD G. ALLEN.
BY Barnes, Kisselle & Laughlin
ATTORNEYS

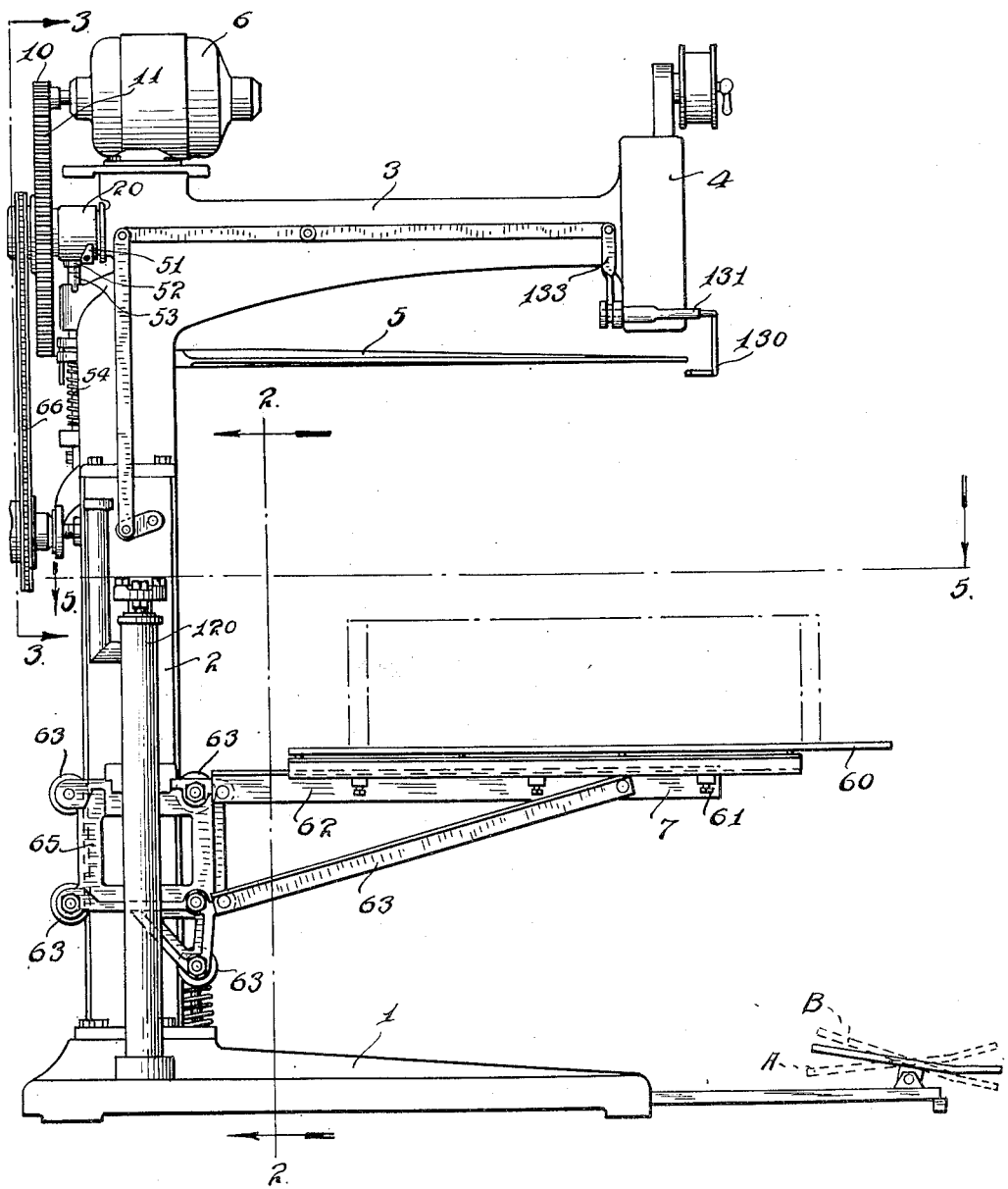

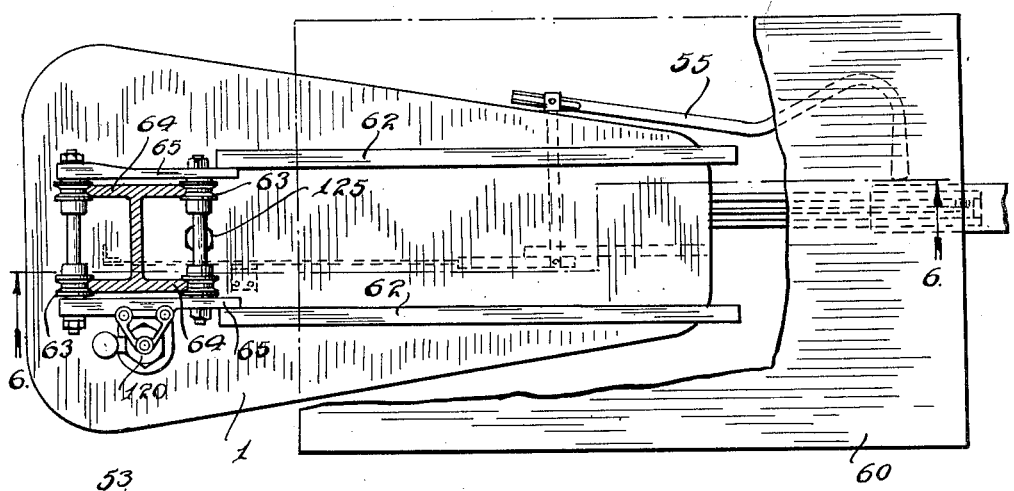
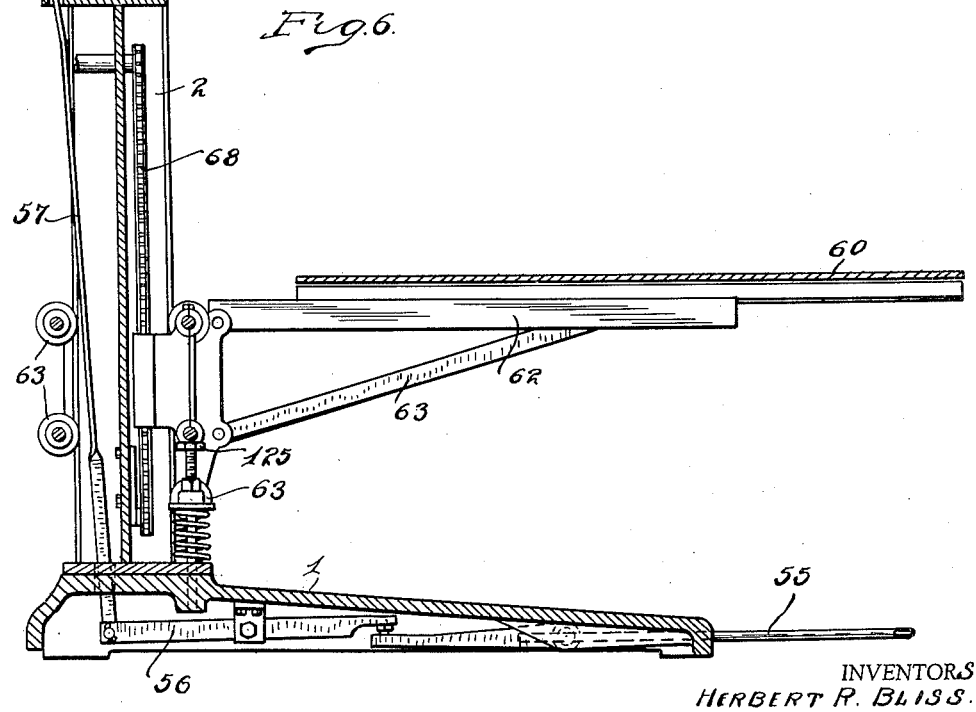

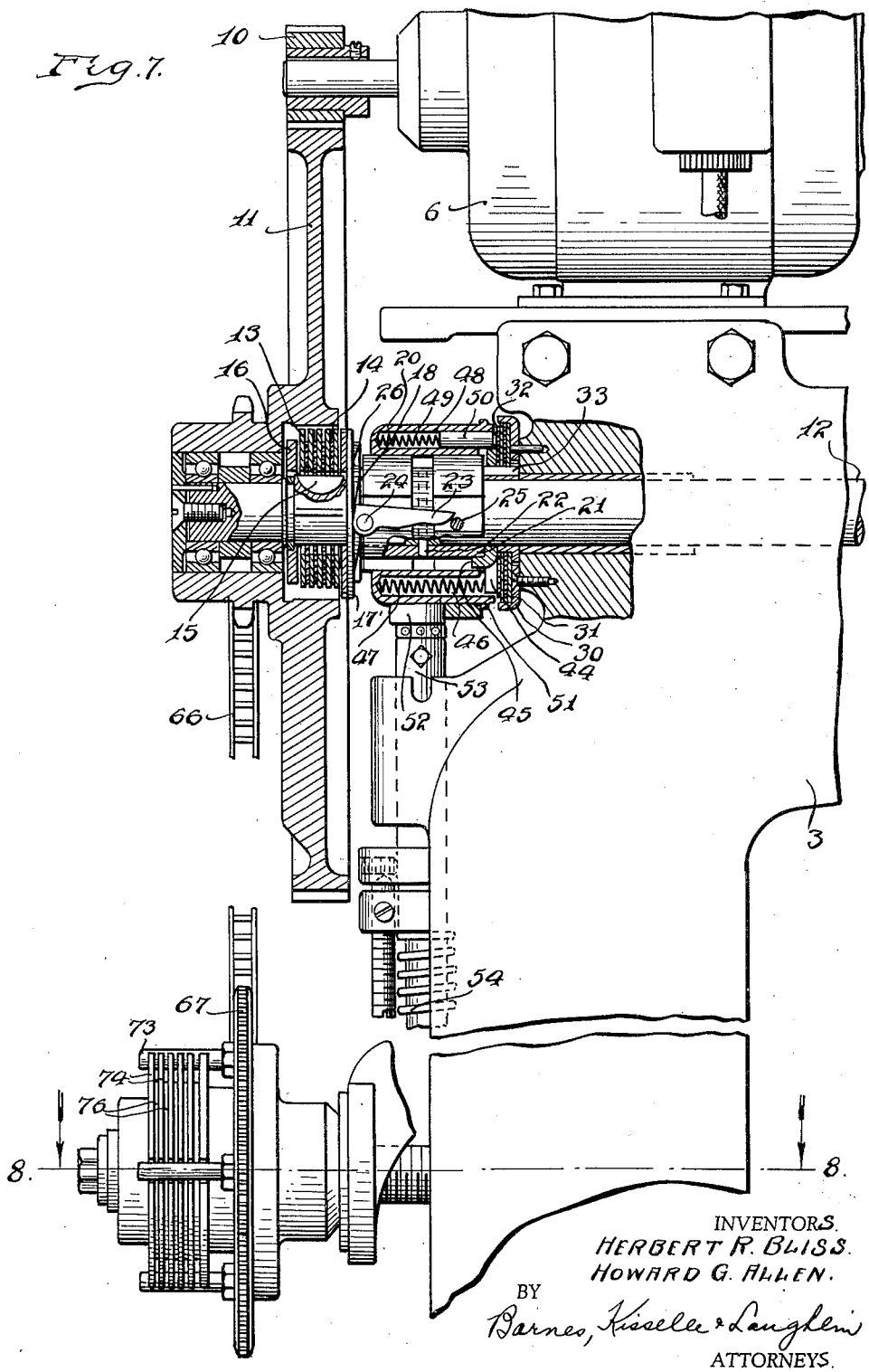

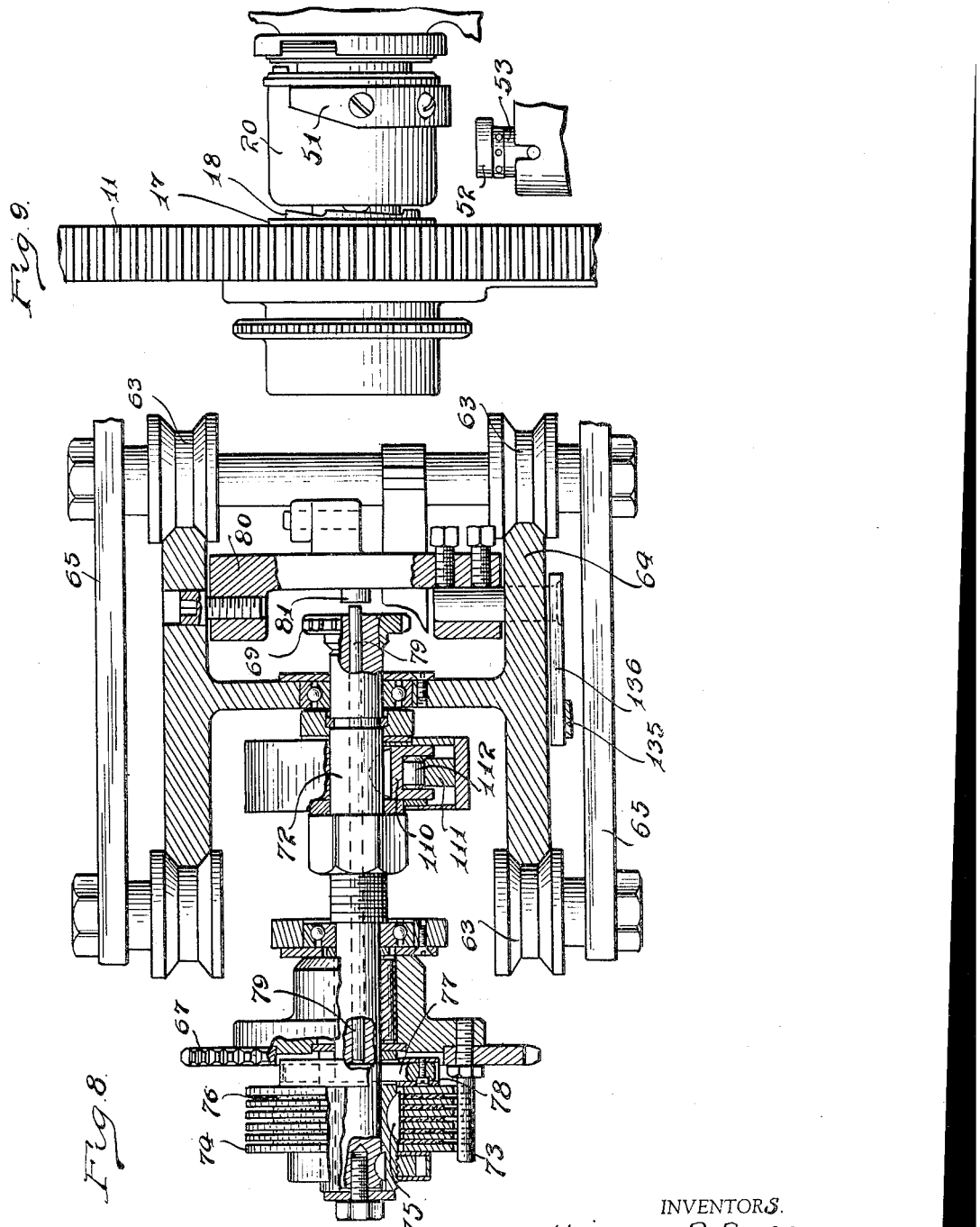

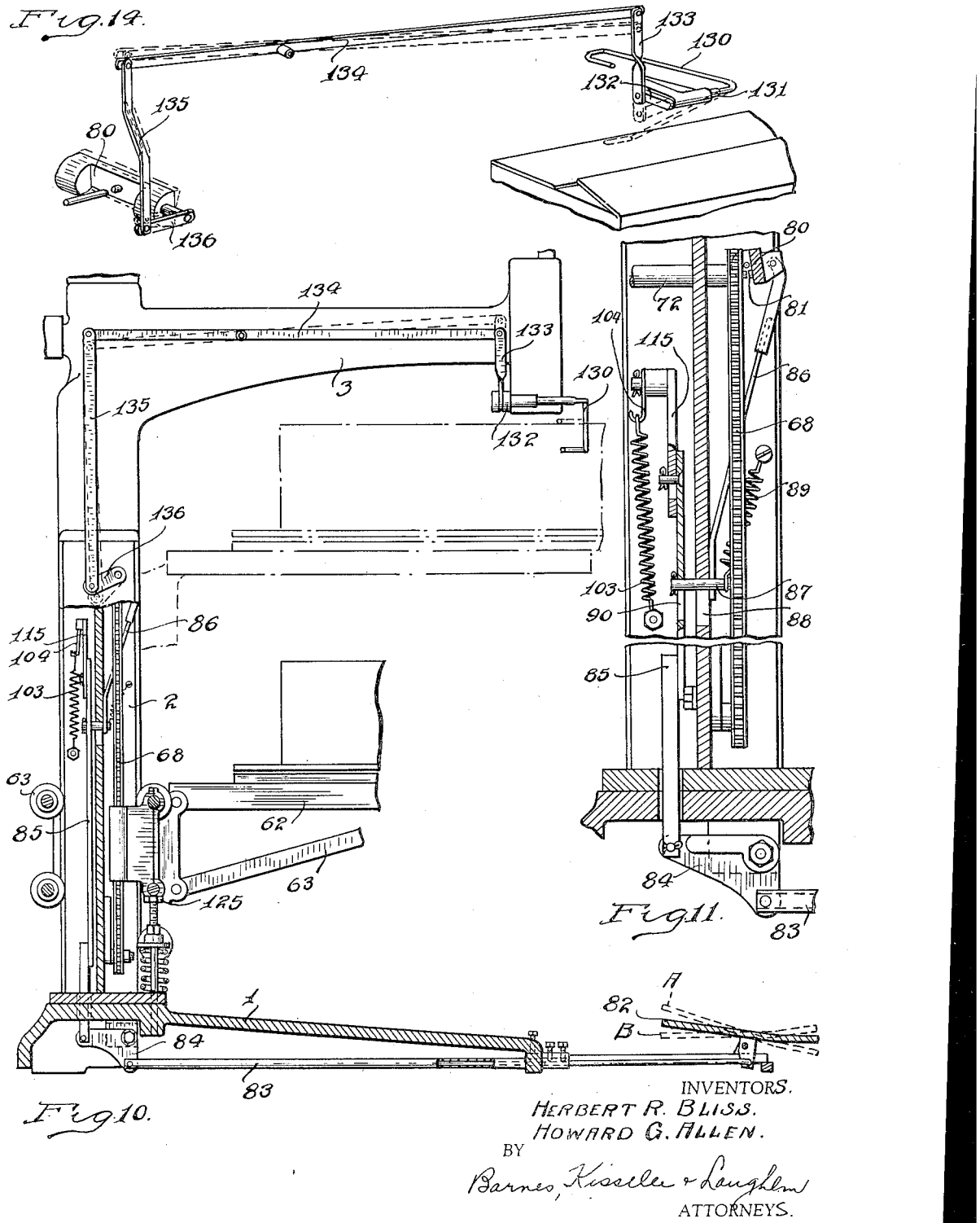

May 22, 1934.　　H. R. BLISS ET AL　　1,959,609
STITCHING MACHINE
Filed April 21, 1932　　7 Sheets-Sheet 7
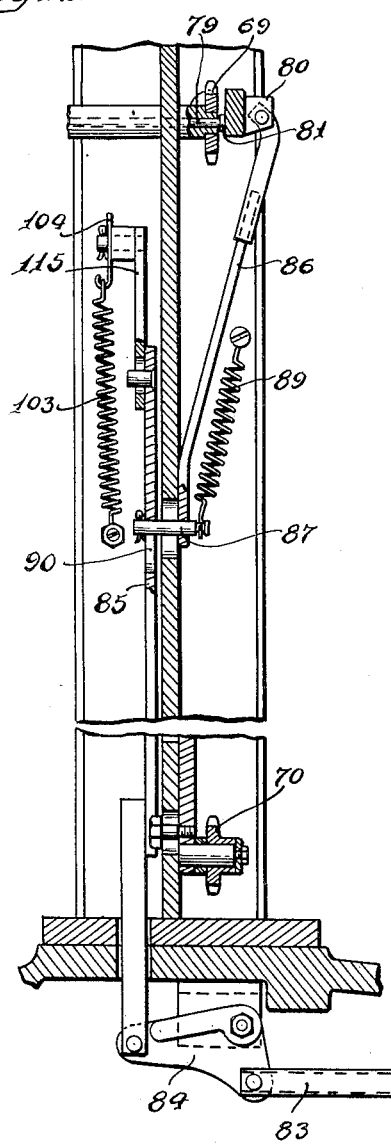
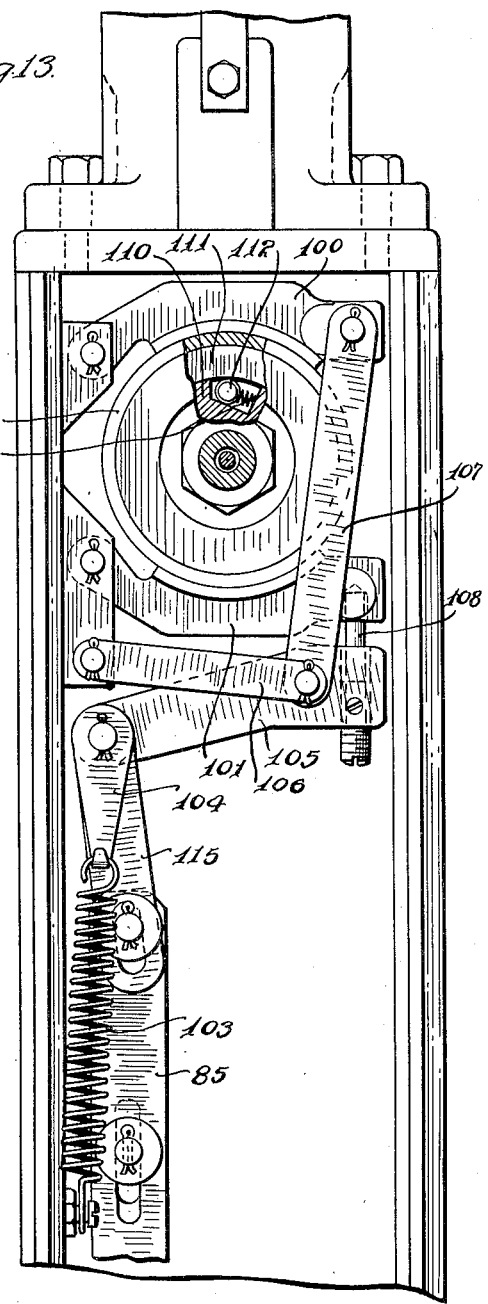
INVENTORS.
HERBERT R. BLISS.
HOWARD G. ALLEN.
BY
Barnes, Kisselle & Laughlin
ATTORNEYS.

Patented May 22, 1934

1,959,609

UNITED STATES PATENT OFFICE 1,959,609

STITCHING MACHINE

Herbert R. Bliss and Howard G. Allen, Niagara Falls, N. Y., assignor, by mesne assignments, to Boston Wire Stitcher Company, Warwick, R. I., a corporation of Maine Application April 21, 1932, Serial No. 606,648

7 Claims. (Cl. 1—11)

This invention relates to a stitching machine and particularly to a stitching machine which embodies a work support for supporting work to be stitched such as, for example, a container of fiber board or the like. More particularly, the invention has to do with a stitching machine wherein there is a stitching head for driving the stitches through pieces of work and wherein the stitching head overlies a support or table for the work. The invention is concerned particularly with an improved stitching machine construction wherein the work support or table is adjustable relative to the stitcher head in order to accommodate for pieces of work of varying sizes.

Such a stitching machine may be used for stitching fiber board containers which may be filled with goods, and from time to time the table or support must necessarily be adjusted relative to the stitcher head in order to take care of containers of different sizes. In some industries the flow of containers to stitching machines may vary in size so that adjustment may be frequent. Accordingly, the present invention contemplates a table or support and associated supporting and operating mechanism for adjusting the support preferably through the means of power. More particularly, the invention contemplates power means for adjusting the work support which is under the control of the operator and which may be controlled for quickly and easily adjusting the table toward and away from the stitcher head. The power may be utilized to raise and lower the table, or the power may be utilized to raise the table only permitting the table to gravitate in lowering.

Another object of the invention is the provision of a mechanism in which the table may be automatically positioned properly as regards the stitcher head when a given container is carried by the table. A still further object of the invention is the provision of an improved clutch structure useful in machines such as stitching machines having an intermittent operation and in which the machine parts are preferably brought to a relatively sudden stop at the end of any intermittent operation. In this regard it may be pointed out that the invention contemplates an improved clutch structure of the friction type so constructed and arranged as to effect positive action in engagement and disengagement and in conjunction with it, friction means are provided for bringing to a stop the mechanism driven by the clutch when said clutch is disengaged.

Other objects will become apparent as the detailed description progresses in conjunction with the accompanying drawings.

Fig. 1 is a side elevational view of a stitching machine constructed in accordance with the invention.

Fig. 2 is a view partly in section and with parts cut away looking on line 2—2 of Fig. 1, this view being enlarged over that shown in Fig. 1.

Fig. 3 is a detailed view looking in the direction of arrows 3—3 of Fig. 1.

Fig. 4 is a detail section taken substantially on line 4—4 of Fig. 2.

Fig. 5 is a view partly in section taken on line 5—5 of Fig. 1.

Fig. 6 is a sectional view taken on line 6—6 of Fig. 5 showing some of the control mechanism.

Fig. 7 is an enlarged sectional view in illustration of the clutch structure for driving the stitching machine.

Fig. 8 is an enlarged sectional view taken substantially on line 8—8 of Fig. 7 showing the clutch structure used in connection with a table adjustment.

Fig. 9 is a detail view illustrating a clutch control arrangement.

Fig. 10 is a view largely in section illustrating some of the controls for the adjustable table.

Fig. 11 is an enlarged sectional view taken through the post of the machine illustrating some of the control mechanism.

Fig. 12 is a view similar to Fig. 11 illustrating some of the control parts in another position.

Fig. 13 is a view in illustration of a braking arrangement for the control of the table.

Fig. 14 is a perspective view in illustration of an arrangement for effecting automatic position of the table.

By referring to Fig. 1 it will be noted that the machine shown is a stitching machine comprising a base 1, a post 2, an arm 3 carrying a stitcher head 4, a blade anvil 5 and a driving motor 6. A support or table is generally referenced 7 and is for carrying the work to be acted upon by the stitcher head. The stitcher head is operated through the means of a gear 10 meshing with a gear 11 and normally the motor and gears run constantly whereas a drive shaft 12 which extends into the head of the machine is intermittently operated at the will of the operator through the means of a suitable clutch mechanism (Fig. 7).

The flywheel 11 is journaled on the shaft 12 as by means of anti-friction bearings, as shown, and it may be recessed near its hub and within this recess there may be a multiplicity of clutch disks, some of which, as at 13, are keyed to the wheel and others of which, as at 14, are keyed to the shaft 12 as by means of a key 15. The disks may be backed up by a ring 16 and pressure may be applied to the disks by a ring 17 which may be provided with cam elements 18 as shown in Fig. 9.

For packing the disks together there is a control element which may be in the form of a shipper sleeve 20 mounted over a sleeve 21 which is pinned to the shaft 12 as by means of pin 22. The shipper sleeve is axially shiftable relative to the sleeve 21 but the two are fixed to rotate with each other. The sleeve 21 carries a suitable number of pivotally mounted arms, one of which is shown at 23, pivoted as at 24 and the shipper sleeve carries a pin 25 for each arm. The arms have heels, as shown at 26, for cooperation with inclined plane or cam elements 18 on the member 17. A holder plate 30 is held stationarily by a part of the machine as shown, and keyed thereto are one or more friction disks 31. Other friction disks 32 are mounted upon keys 33 which extend into slots in a plate 44. The plate 44 rotates with the shaft, shipper sleeve and sleeve 21, through the means of one or more lugs 45 connecting the same to the shipper sleeve. The shipper sleeve has a plurality of apertures 46 for housing each a coil spring 47, and the shipper sleeve may have apertures 48 for housing each a spring 49 acting upon the plunger 50. The apertures 46 and 48 may be alternately arranged. On the outside of the shipper sleeve is a cam element 51 (Fig. 9) for cooperation with a control element 52 on a reciprocable rod 53. A coil spring 54 normally holds the element 52 in the position shown in Fig. 7 acting upon the cam 51 thus holding the parts in the position shown in Fig. 7. An operator may pull the element 53 downwardly through the means of a pedal 55 acting through a lever 56 and link 57 which connects to the element 53, see Figs. 5 and 6.

Before proceeding with further description of the machine, the operation of the clutch just described may be gone into. Assume that the motor and wheel 11 are rotating; the parts normally take the position illustrated in Fig. 7 with the clutch disengaged. This is because of the action of the spring 54. An operator may now trip the pedal 55 lowering the element 52; the springs 47 immediately shift the shipper sleeve from right to left; the pins 25 move under the free ends of the arms 23 and rock the same to the end that the heel 26 of each arm 23 comes into engagement with a cam surface 18. This packs the driving and driven disks 13 and 14 together and establishes a clutching engagement between the wheel 11 and shaft 12. This clutching engagement will subsist as long as the operator keeps the element 53 depressed. Upon release of the pedal element 53 shifts upwardly and the cam element 51 engages the member 52 and shifts the shipper sleeve to the right releasing the packing pressure on the friction disks 13 and 14. At this time the pins 50 engage a clutch disk 32 and pack the disk 32 and 31 together thus establishing, so to speak, a clutching engagement which sets up friction and brings the shaft 12 and the parts driven thereby to a stop. The member 52 advantageously is an eccentric so that it may be adjusted relative to the cam 51. It may be so adjusted as to bring the end of the shipper sleeve up against the end disk 32 when the clutch is disengaged to increase the frictional engagement for stoppage purposes.

The table may comprise a surface member 60 which may be adjustably held upon the support as by means of set screws 61, and the table may comprise a horizontal member 62 and angular brace members 63. A suitable supporting structure for the table may comprise rollers 63, and a post of the stitching machine may be in the form of track members 64 upon which the rollers may act. These rollers may be carried by a frame or the like 65 to which the table is connected.

The table may be adjusted vertically by the rollers actuating along the tracks, and power means for accomplishing this may take the form of a chain 66 running over a sprocket on the gear wheel 11 and a sprocket 67. It will be appreciated that chain 66 runs continually. An endless chain 68 (Fig. 2) runs over a sprocket 69, and an idler sprocket 70 and one side of this chain is connected to the frame 65, as shown at 71, so that the chain may operate to raise and lower the table.

Another clutch is disposed between the sprocket 67 and sprocket 69 (Fig. 8); sprocket 69 is keyed to shaft 72 whereas sprocket 67 is rotatable thereon. One or more pins 73 carried by sprocket 67 rotate a plurality of clutch disks 74 and keyed to the shaft 72, as by means of a key 75 are a plurality of clutch disks 76. A cross pin 77 is provided, the same being equipped with a pressure ring 78, and an axially shiftable pin 79 is located in a bore in the shaft 72. When the pin 79 is shifted to the left, as Fig. 8 is viewed, it contacts with the cross pin 77, which through the pressure ring 78 presses the disks 74 and 76 together so that the sprocket 67 may drive the shaft 72.

Means are provided for manually shifting the pin 79. This means may take the form of a rocker member 80 having a contact member 81 for engaging the pin 79. A pedal 82 is pivotally mounted (see Fig. 10) and it is normally in the position of the full lines shown in Fig. 10 and capable of movement to positions A and B. This pedal may shift rod 83 which actuates bell crank 84 and shifts the vertically extending member 85. By referring to Fig. 11 it will be noted that a rod 86 connects to the member 80 and this rod has a pin 87 extending through an elongated slot 88 in the post framework. A coil spring 89 holds the pin against the top of the slot with the member 80 positioned to free the pin 79, as shown in Fig. 11. The member 85 has an elongated slot 90 through which the pin 87 extends. If the pedal 82 be moved to position B the rod 85 is pulled downwardly and this in turn rocks the member 80 from the position shown in Fig. 11 to the position shown in Fig. 12 thus shifting the pin 79 and engaging the clutch shown in Fig. 8 so as to drive the sprocket 69. This may move the chain in a direction as to elevate the table. After the table has been elevated it may be held in such elevated position by a friction brake. This is shown in Fig. 13 and comprises a brake shoe 100 and a brake shoe 101, each pivotally mounted, the brake shoes acting upon a drum 102 through means of a coil spring 103 exerting a tension upon an element 104 connected to an arm 105. A link 106 is pivoted to the arm 105 and a link 107 pivotally connects the arm 105 and the shoe 100. The arm 105 is associated with the shoe 101 through an adjustable contact member 108. It will be noted that as the spring pulls the arm 105 counterclockwise that the pivoted brake shoes are clamped around the brake drum.

A one way drive connection is preferably disposed between the shaft 72 and the drum 102. This may be constituted by an overrunning roller clutch comprising an inner member 110 and an outer member 111 with rollers 112 disposed between the members as shown in Figs. 8 and 13. As Fig. 13 is viewed the shaft 12 may rotate counter-clockwise leaving the drum held stationary by the brake shoes, but the shaft may not rotate clockwise unless the brake shoes are released from the drum. A spring 113 may act upon each roller to urge it toward the converging walls of its pocket.

The drum may be released from the brake shoes by manipulation of the foot pedal 82 by means of shifting it to position A (see Fig. 10). When the pedal is moved to position A the element 85 is raised, which it may be without interference from pin 87 due to the elongated slot 90. At the upper end of element 85 is a link 115 (Figs. 12 and 13) which connects to arm 105. As Fig. 13 is viewed, the arm 105 is actuated with a clockwise movement by an upward shift of link 115, and the brake shoes are released from the drum by this action. Fig. 11 shows the part 85 in its normal position; Fig. 12 shows the part 85 lowered for engaging the clutch for the elevating mechanism, and an inspection of Fig. 11 will make it readily apparent that the element 85 may be lifted to release the holding brakes.

Accordingly, as long as the machine is running the table may be elevated by power; the operator merely shifts the pedal 82 to position B thus causing rotation of gears 69 and movement of chain 68. As soon as the pedal is released the table will remain held by the brake shoes. To lower the table the pedal 82 is shifted to position A thus releasing the brake shoes. A dash pot construction may be provided for governing the lowering of the table. As shown in Fig. 2, a cylinder 120 containing a fluid may be disposed alongside the post of the machine, and an arm 121 fixed to a movable part connects to a piston rod 122 which may have a piston 123 with apertures therein and a valving disk 124. As the table is elevated and the piston is elevated the valving disk opens the ports, but as the table gravitates the valving disk closes the ports and causes a slow passage of oil around the piston. The lowermost position of the table may be determined by an adjustable spring pressed stop member 125 (Fig. 6).

Means are preferably provided for stopping the table at the correct position as it moves upwardly. This is particularly advantageous where the table movement is rapid as it is not feasible for an operator to accurately stop the table movement. Such a means may take the form of an element actuated by a container upon the table. Such an element is illustrated at 130 (Fig. 1) pivoted in the head of the machine, as at 131, and connected by an arm 132 to a link 133 (Fig. 14). The link 133 in turn connects to a rocker arm 134 having a link 135 connected to its other end, which link 135 connects through an arm 136 to the rocker element 80. The two positions which these parts take are illustrated by full and dotted lines in Fig. 14. When a box or container is placed upon the table and it is necessary to elevate the table the operator through the pedal 82 causes the table to elevate under power, and the top of the container strikes the element 130 and pivots the same, and through the arms and links just mentioned the rocker element 80 is actuated from a position as shown in Fig. 12 to a position as shown in Fig. 11 thus releasing the pin 79 and causing a release of the table elevating clutch. In this action the element 80 may be rocked with sufficient force to overcome the pressure of the foot of the operator upon the pedal 82. Thus, the upper surface of the container is accurately positioned to be worked upon by the stitcher head and anvil of the machine.

While the mechanism for carrying out this invention has embodied a rather complicated and intricate mechanism, yet in the end the control and operation of the machine is rendered simplified. The operator, after the usual manner, controls the starting and stopping of the stitching mechanism by means of the pedal 55, and may cause table elevation and table lowering by shifting pedal 82 to positions B and A respectively. While automatic means may be employed for accurately stopping the elevation of the table, the operator may control the lowering of the table through the brake mechanism.

We claim:

1. The combination with a stitching machine having a vertical post, an arm projecting from said post, and a stitcher head carried by the arm, of a work table, a work table support shiftable along the post, driving means arranged to elevate the table relative to the post, an operator controlled clutch for establishing a connection between the driving means and support, braking means for retaining the table in given position of adjustment, and an overrunning drive connection between the braking means and the support.

2. The combination with a stitching machine having a post and a stitcher head carried by the upper portion of the post, of a work table, a work table support shiftable along the post, an endless chain running over sprockets, means connecting one side of the chain with said support, driving means, a normally open clutch between the driving means and one sprocket, and operator controlled means for engaging the clutch whereby to elevate the table along the post.

3. The combination with a stitching machine having a post and a stitcher head carried by the upper portion of the post, of a work table, a work table support shiftable along the post, an endless chain running over sprockets, means connecting one side of the chain with said support, driving means, a normally open clutch between the driving means and one sprocket, operator controlled means for engaging the clutch whereby to elevate the table along the post, braking means associated with the driven sprocket for holding the table in given position of adjustment, and an overrunning clutch between the braking means and said sprocket.

4. The combination with a stitching machine having a post and a stitcher head carried by the upper portion of the post, of a work table, a work table support shiftable along the post, an endless chain running over sprockets, means connecting one side of the chain with said support, driving means, a normally open clutch between the driving means and one sprocket, operator controlled means for engaging the clutch whereby to elevate the table along the post, braking means associated with the driven sprocket for holding the table in given position of adjustment, an overrunning clutch between the braking means and said sprocket, and operator controlled means for releasing the braking means whereby to allow the table to gravitate to a lower position on the post.

5. The combination with a stitching machine having a post and a stitcher head carried by the upper portion of the post, of a work table, a work table support shiftable along the post, an endless chain running over sprockets, means connecting one side of the chain with said support, driving means, a normally opened clutch between the driving means and one sprocket, operator controlled means for engaging the clutch whereby to elevate the table along the post, braking means associated with the driven sprocket for holding the table in given position of adjustment, an overrunning clutch between the braking means and said sprocket, operator controlled means for releasing the braking means whereby to allow the table to gravitate to a lower position on the post, and a dash pot for governing the gravitation of the table.

6. The combination with a stitching machine having a post and a stitcher head carried near the upper end of the post, of a table, guideways on the post, a table support running on the guideways on the post, a rotatable shaft, means connecting the shaft and table whereby rotation of the shaft may shift the table along the post, power driving means, a normally open clutch between said power means and shaft, a normally effective braking device acting upon the shaft, a one-way drive connection between the braking device and shaft, and a control element shiftable by an operator to close the clutch and shiftable into another position to release the braking device, said one-way driving connection permitting the shaft to rotate for table elevation and holding the table in adjusted position through the means of the braking device.

7. The combination of a stitching machine having a vertical supporting post, an arm projecting laterally from the top of the post, a stitcher head on the end of the arm arranged to drive stitches downwardly into work, a work table, means mounting the work table to the post for vertical movement of the work table on the post, power driving means, an operator controlled clutch for interconnecting the power driving means and table to shift the table upwardly on said post toward the stitcher head, operator controlled means for disconnecting the clutch, operator controlled means for holding the table against movement upon the opening of the clutch and controllable to allow the table to gravitate downwardly on the post, a shiftable controlling element positioned adjacent the horizontal plane of that portion of the stitcher head out of which the stitches are driven, means connecting the shiftable control element and clutch for opening the clutch upon the shift of said controlling element, and said controlling element being arranged to be engaged by work positioned on the table when the table is moving upwardly on the post to be shifted thereby to in turn open the clutch whereby to automatically position the work for the reception of stitches driven by the stitcher head.

HERBERT R. BLISS.
HOWARD G. ALLEN.